United States Patent
Thelen

(10) Patent No.: US 7,869,618 B2
(45) Date of Patent: Jan. 11, 2011

(54) METHOD AND SYSTEM FOR CONTROL OF A DEVICE

(75) Inventor: Eric Thelen, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1021 days.

(21) Appl. No.: 10/596,596

(22) PCT Filed: Dec. 10, 2004

(86) PCT No.: PCT/IB2004/052761

§ 371 (c)(1),
(2), (4) Date: Aug. 25, 2006

(87) PCT Pub. No.: WO2005/062273

PCT Pub. Date: Jul. 7, 2005

(65) Prior Publication Data

US 2009/0245568 A1 Oct. 1, 2009

(30) Foreign Application Priority Data

Dec. 18, 2003 (EP) .................................. 03104808

(51) Int. Cl.
*G06K 9/68* (2006.01)
*G06K 9/22* (2006.01)
(52) U.S. Cl. ...................... 382/100; 382/218; 382/313; 352/42
(58) Field of Classification Search .................. 382/100, 382/209, 217, 218, 313, 317; 353/42
See application file for complete search history.

(56) References Cited

U.S. PATENT DOCUMENTS

| 6,382,798 | B1 | 5/2002 | Habraken |
| 7,129,986 | B2 * | 10/2006 | Wang et al. ............... 348/376 |
| 2001/0030668 | A1 * | 10/2001 | Erten et al. ............... 345/863 |
| 2001/0045940 | A1 * | 11/2001 | Hansen ...................... 345/158 |
| 2003/0007104 | A1 | 1/2003 | Hoshino et al. |
| 2003/0030622 | A1 | 2/2003 | Vaarala |
| 2004/0228504 | A1 * | 11/2004 | Chang ........................ 382/118 |
| 2005/0104849 | A1 * | 5/2005 | Hoile ......................... 345/157 |
| 2006/0050052 | A1 * | 3/2006 | Mekenkamp et al. ....... 345/156 |

(Continued)

FOREIGN PATENT DOCUMENTS

JP 07271507 A 10/1995

(Continued)

OTHER PUBLICATIONS

Kirstein et al. "Interaction with a Projection Screen Using a Camera-Tracked Laser Pointer." Proceedings, Multimedia Modeling, Oct. 12, 1998, pp. 191-192.*

(Continued)

*Primary Examiner*—Jon Chang

(57) ABSTRACT

The invention describes a method for control of a device ($1_a$, $1_b$, $1_c$). The method comprises visually presenting a number of user options for the device to be controlled ($1_a$, $1_b$, $1_c$), aiming a pointing device (2) comprising a camera (3) at the visual presentation ($4_a$, $4_b$, $4_c$, $4_d$, $4_e$) of the user options to choose a desired option, generating an image (5) of a target area (6) aimed at by the pointing device (2) and comparing the target area image (5) with a pre-defined template of the visual presentation ($4_a$, $4_b$, $4_c$, $4_d$, $4_e$) to determine the chosen option.

19 Claims, 4 Drawing Sheets

U.S. PATENT DOCUMENTS

2006/0176274 A1* 8/2006 Cheng et al. ............... 345/157

FOREIGN PATENT DOCUMENTS

| JP | 08335136 A | 12/1996 |
|---|---|---|
| JP | 200338599 A | 12/2000 |
| JP | 2001155139 A | 6/2001 |
| JP | 2003099713 A | 4/2003 |
| WO | 0060534 A1 | 10/2000 |
| WO | 03056505 A1 | 7/2003 |
| WO | 2004084544 A1 | 9/2004 |

OTHER PUBLICATIONS

Choi et al. "LaserPen: a New Pointing Device for a Beam Projector." 2003 IEEE International Symposium on Virtual Environments, Human-Computer Interfaces and Measurement Systems, Jul. 27, 2009, pp. 132-137.*

By M. Roth et al. Entitled: Computer Vision for Interactive Computer Graphics; Mitsubishi Electric Research Laboratories; http://merl.com; TR9902; Jan. 1999, IEEE Computer Graphics and Applications, May-Jun. 1998; pp. 42-53.

By K. Choi et al. Entitled: Laserpen: A New Pointing Device for a Beam Projector; Virtual Environments, Human-Computer Interface and Measurement Systems, 2003, VECIMS 2003 International Symposium on Jul. 27-29 2003. Pages Abstract, pp. 132-137.

By C. Kirstein et al. Entitled: Interaction with a Projection Screen Using a Camera-Tracked Laser Pointer; University of Dortmund, Germany; http://Is7-www.informatik.uni-dortmund.DE; Downloaded on Oct. 8, 2009 from IEEE Xplore; pp. 1-2.

* cited by examiner

METHOD AND SYSTEM FOR CONTROL OF A DEVICE

This invention relates in general to a method and system for control of a device and, in particular, to a method and system for remote control of a consumer electronics device, e.g. audio-visual device such as television (TV), video cassette recorder (VCR), digital video disc (DVD) player, personal computer (PC) etc.

Remote controls are used today together with almost any consumer electronics device, e.g. television, DVD player, tuner, etc. In the average household, multiple remote controls—often one for each consumer electronics device—can be required. Even for a person well acquainted with the consumer electronics devices he owns, it is a challenge to remember what each button on each remote control is actually for. Furthermore, the on-screen menu-driven navigation available for some consumer electronics devices is often less than intuitive, particularly for users that might not possess an in-depth knowledge of the options available for the device. The result is that the user must continually examine the menu presented on the screen to locate the option he is looking for, and then look down at the remote control to search for the appropriate button. Quite often the buttons are given non-intuitive names or abbreviations. Additionally, a button on the remote control might also perform a further function which is accessed by first pressing a mode button. The multitude of options available for modern consumer electronics devices unfortunately mean that for many users, programming such a device can become an exercise in frustration. The large number of buttons and non-intuitive menu options can make the programming of a device more difficult than necessary and often result in the user not getting the most out of the devices he has bought.

Using all one's consumer electronics devices to the full is made even more difficult by the fact that almost every consumer electronics device today comes with its own remote control device. Whilst most remote control button abbreviations and symbols are by now standardised to allow marketing of the same remote control device in countries of different languages, even so it might be that different abbreviations or symbols are used on different remote controls to perform the same function, for example the abbreviation "CH" and "PR" might be used to indicate "channel" or "program", meaning essentially the same thing. The remote controls also differ in shape, size, overall appearance and even battery requirements.

In an effort to reduce the confusion caused by such a multitude of remote controls, a new product category of "universal remote controls" has been developed. However, even a universal remote control cannot hope to access all the functions offered by every consumer electronics device available on the market today, particularly since new technologies and features are continually being developed. Furthermore, the wide variety of functions offered by modern consumer electronics devices necessitates a correspondingly large number of buttons to invoke these functions, requiring an inconveniently large remote control to accommodate all the buttons.

A number of developments attempt to address the problem of simple remote control of consumer electronics devices. For example EP 0372674 suggests a method involving a camera and a stationary light source, both connected to a microcomputer. The moveable camera, containing a lens and a detector, is mounted on the head of the user. Movements of the user's head relative to the fixed light source, detected by the detector in the camera, are translated into movements of a cursor on a television screen. An obvious disadvantage of such a method is that the user has to wear a camera on his head. He must move his head in various directions in order to move the cursor on the screen, whilst continually watching the screen to see if he is directing the cursor to the desired position.

Therefore, an object of the present invention is to provide a method and user interface for convenient and intuitive remote control of a device.

To this end, the present invention provides a method for control of a device, which method comprises visually presenting a number of user options for the device to be controlled, aiming a pointing device comprising a camera at the visual presentation of the user options to choose a desired option, generating an image of a target area aimed at by the pointing device, and comparing the target area image with a pre-defined template of the visual presentation to determine the chosen option. The phrase "target area image" is to be understood in the broadest possible sense, for example the target area image might comprise merely image data concerning significant points of the entire image, e.g. enhanced contours, corners, edges etc.

An appropriate user interface for remote control of a device comprises an accessing unit for accessing pre-defined templates associated with visual presentations of user options for the device to be controlled, a pointing device for aiming at a desired option in a visual presentation of the user options, comprising a camera for generating an image of a target area of at least part of the visual presentation, and an image interpreter for locating the target area or a point of the target area in a pre-defined template in order to determine the chosen option.

The method and the user interface thus provide a comfortable way for a user to control any device by simply aiming a compact hand-held pointing device to make an option selection without having to look away from the consumer electronics device while making a selection, and without first having to become acquainted with a multitude of buttons.

The dependent claims and the subsequent description disclose particularly advantageous embodiments and features of the invention.

User options for a consumer electronics device can be presented to the user in a number of ways, both static and dynamic. The simplest visual presentation of the user options for a device in static form is the front of the device itself, where various options are available in the form of buttons or knobs, for example the stop, fast forward, record and play buttons on a VCR. Another example of a static visual presentation might be to show the user options in printed form, for example as a computer printout, or a program guide in a TV magazine. Especially for a device such as a TV, or DVD player which can be connected to a television, the options may be available to the user in static form as buttons on the front of the device, and can also easily be dynamically displayed on the television screen. Here, the options might be shown in the form of menu items or as icons. In a particularly preferred embodiment of the invention, user options for more than one device can be shown simultaneously in one visual presentation. For example, tuner options and DVD options might be displayed together, particularly options that are relevant to both devices. One example of such a combination of options might be to display a set of tuner audio options such as surround sound, Dolby etc, along with DVD options such as wide screen, sub-titles etc. The user can thus easily and quickly customise the options for both devices before commencing viewing.

Another way of visually presenting the user options for a device in dynamic form might be to project them as an image backdrop onto a surface, for example a wall or a screen.

Additionally, the invention might easily provide the user with a means of personalising the options for the device, for example by only displaying a small number of options on the screen at one time if the user has poor vision. Further, the user might specifically choose to omit functions that he is unlikely ever to require, for example, for his DVD player, he might never wish to view a film accompanied by foreign-language subtitles. In this case, he can personalise his user interface to omit these options from the visual presentation. A device such as a television can be configured so that for some users, only a subset of the available options is accessible. In this way, certain channels can be made accessible only by authorised users, for example to protect children from watching programs unsuitable to their age group.

It is a central point of the invention that the user can choose among the options available by aiming a pointing device containing a camera at the visual presentation of the user options. The camera is preferably incorporated in the pointing device but might equally be mounted on the pointing device, and is preferably oriented in such a way that it generates images of the area in front of the pointing device targeted by the user. The image of the target area might be only a small subset of the entire visual presentation, it might cover the visual presentation in its entirety, or it might also include an area surrounding the visual presentation. The size of the target area image in relation to the entire visual presentation might depend on the size of the visual presentation, the distance between the pointing device and the presentation, and on the capabilities of the camera itself. The user might be positioned so that the pointing device is at some distance from the visual presentation, for example when the user is seated whilst watching television. Equally, the user might hold the pointing device quite close to the visual presentation, as might arise when the user is aiming the pointing device at a TV program guide in magazine form.

In a preferred embodiment of the invention, a light source might be mounted in or on the pointing device. The light source might serve to illuminate the area at which the pointing device is aimed, so that the user can easily peruse the visual presentation even if the surroundings are dark. Equally, the light source might be a source of laser light source of a concentrated beam of light emitted in the direction of pointing, so that a point of light appears at or near the target point on the visual presentation at which the user is aiming, providing visual positional feedback to help the user aim at the desired option. A simple realisation might be a laser light source incorporated in or mounted on the pointing device in an appropriate manner. In the following therefore, it is assumed—without limiting the invention in any way—that the source of concentrated light is a laser beam.

For ease of use, the pointing device can be in the shape of a wand or pen in an elongated form that can be grasped comfortably by the user. The user can thus direct the pointing device at a target point in the visual presentation while positioned at a comfortable viewing distance from it. Equally, the pointing device might be shaped in the form of a pistol.

The pointing device might be aimed by the user at a particular option in a visual presentation, for example at the play button on the front of a VCR device, at a DVD option displayed on a TV screen, or at a selected program in a TV magazine. To indicate that a particular selection is being made, the user might move the pointing device in a predefined manner over the visual presentation, for example by describing a loop or circular shape around the desired option. The user might move the pointing device through the air at a distance removed from visual presentation, or might move the pointing device directly over or very close to the visual presentation. Another way of indicating a particular option selection might be to aim the pointing device steadily at the option for a pre-defined length of time. Equally, the user might flick the pointing device across the visual presentation to indicate, for example, a return to normal program viewing after removing the visual presentation from the screen, or to a previous menu level. The movement of the pointing device relative to the visual presentation might preferably be detected by image processing software in the control unit, or might be detected by a motion sensor in the pointing device. A further possibility might be to press a button on the pointing device to indicate selection of the option at which the pointing device is aimed. In a preferred embodiment, the control unit can initiate a confirmation dialog in order to ascertain that it has correctly interpreted the user's actions, for example if the user has aimed at a point considerably removed from the optical centre of an option while pressing the button or moving the pointing device in a pre-defined manner. In this case the control unit might request confirmation before proceeding to initiate the selected option or function.

The control unit can preferably alter the visual presentation to highlight the selected option in some way, for example by making the option appear to flash or by highlighting the region in the visual presentation aimed at by the user perhaps accompanying this by an audible "click" sound. The pointing device might also select a function in the visual presentation using a "drag and drop" technique, particularly when the user must navigate through larger content spaces for example by dragging an icon representing buffered DVD movie data to another icon representing a trash can, thus indicating that the buffered data be deleted from memory. Various functions might be initiated by the user, whereby the user selects the option in a manner similar to a "double-click", for example, by repeating the motion of the pointing device in the pre-defined manner, or twice pressing a button on the pointing device.

In a particularly advantageous embodiment of the invention, the image of the target area is transmitted from the pointing device in a wireless manner, for example using Bluetooth or 802.11b standards, to a control unit assigned to the device to be controlled. The control unit preferably comprises a receiver for receiving the target area images and an image interpreter, which might be in the form of a processor or controller. The target area images might equally be transmitted to the control unit by means of a cable attaching the pointing device to the control unit.

To determine which option has been selected by the user, the image interpreter compares the received target area images to a number of pre-defined templates of the visual presentation. A single pre-defined template might suffice for the comparison, or it may be necessary to apply more than one template in order to make a successful comparison.

Pre-defined templates can be stored in an internal memory, or might equally be accessed from an external source. Preferably, the control unit comprises an accessing unit with an appropriate interface for obtaining pre-defined templates for the visual presentation of the device to be controlled from, for example, an internal or external memory, a memory stick, an intranet or the internet. A template can be a graphic representation of the front of the device to be controlled, for example a simplified representation of the front of a VCR device featuring the user options available, for example the buttons representing the play, fast-forward, rewind, stop and record functions. A template can also be a graphic representation of an options menu as displayed on a TV screen and might indicate the locations of the available device options associated with particular areas of the visual presentation. For example, the user options for a DVD player such as play, fast-forward, sub-titles, language etc., can also be visually presented on the TV screen. The template can also depict the area around the visual presentation, for example it may include the housing of the device, and may even include some of the immediate surroundings of the device.

User options for a device which can display these on a screen can often be presented in the form of menus, where the user can traverse the menus to arrive at the desired option or function. In a preferred embodiment of the invention, a template exists for each possible menu level for the device to be controlled, so that the user can aim the pointing device at any one of the available options at any level of control of the device. Another type of template might have the appearance of a TV program guide in a magazine. Here, templates for the layout of the pages in the TV guide might be obtained and/or updated by the accessing unit, for example on a daily or weekly basis. Preferably, the image interpretation software is compatible with the format of the TV guide pages. The templates preferably feature the positions on the pages of the various program options available to the user. The user might aim the pointing device over the visual presentation in the form of a page in an actual TV program guide to select a particular option, or the guide might be visually presented on the TV screen at which the user can aim the pointing device to choose between the options available.

For processing the target area image in order to determine the chosen option, it is expedient to apply computer vision techniques to find the point in the visual presentation at which the user has aimed, i.e. the target point.

In one embodiment of the invention, a fixed point in the target area image, preferably the centre of the target area image, obtained by extending an imaginary line in the direction of the longitudinal axis of the pointing device to the visual presentation, might be used as the target point.

A method of processing the target area images of the visual presentation using computer vision algorithms might comprise detecting distinctive points in the target image and determining corresponding points in the template of the visual presentation, and developing a transformation for mapping the points in the target image to the corresponding points in the template. The distinctive points of the target area image might be points of the visual presentation, or might equally be points in the area surrounding the visual presentation, for example the corners of a television screen, or points belonging to an object in the vicinity of the device to be controlled and which are also recorded in the pre-defined templates. This transformation can then be used to determine the position and aspect of the pointing device relative to the visual presentation so that the intersection point of an axis of the pointing device with the visual presentation can be located in the template. The position of this intersection in the template corresponds to the target point on the visual presentation, and can be used to easily determine which of the options has been targeted by the user. The position of the target point in the pre-defined template indicates the option selected by the user. In this way, comparing the target area image with the pre-defined template is restricted to identifying and comparing only salient points such as distinctive corner points. The term "comparing" as applicable in this invention is to be understood in a broad sense, i.e. by only comparing sufficient features in order to quickly identify the point at which the user is aiming.

Another possible way of determining the option selected by the user is to directly compare the received target area image, centred around the target point, with a pre-defined template to locate the point targeted in the visual presentation using methods such as pattern-matching. Another way of comparing the target area image with the pre-defined template restrict itself to identifying and comparing only salient points such as distinctive corner points.

In a further embodiment of the invention, the location of the laser point, transmitted to the receiver in the control unit as part of the target area image, might be used as the target point to locate the option selected by the user. The laser point may be superimposed on the centre of the target area image, but might equally well be offset from the centre of the target area image.

The control unit can be used to control a single device, but might equally be used to control a plurality of such devices, for example one control unit might be assigned to a TV, a DVD player, a tuner and a VCR. In this way, the pointing device can be used as a remote control for one device or for a plurality of devices. The pointing device can also be used to control a number of consumer electronics devices, each incorporating their own dedicated control units. Furthermore, a number of pointing devices can be assigned to a control unit, so that, for example, each member of a household has his own pointing device. On the other hand, one pointing device might be assigned to a number of control units in different environments, for example so that a user might use his pointing device for controlling devices at home as well as in the office.

In a preferred embodiment of the invention, the control unit might be connected to a projector which can project visual presentations of user options for a number of devices in the form of an image backdrop onto a suitable surface, for example a wall. The control unit might also avail of a separate screen, or might use a screen of one of the devices to be controlled. In this way, user options can be presented in a comfortable manner for a device which does not otherwise feature a display, for example a video recorder. The options represented by the buttons on the compact front of the device can, for example, be presented as menu options on the larger image backdrop for ease of selection. In a further preferred embodiment of the invention, the control unit can produce a hard-copy of a visual presentation, for example it can print out a program selection.

Other objects and features of the present invention will become apparent from the following detailed descriptions considered in conjunction with the accompanying drawing. It is to be understood, however, that the drawings are designed solely for the purposes of illustration and not as a definition of the limits of the invention.

Figure 1:
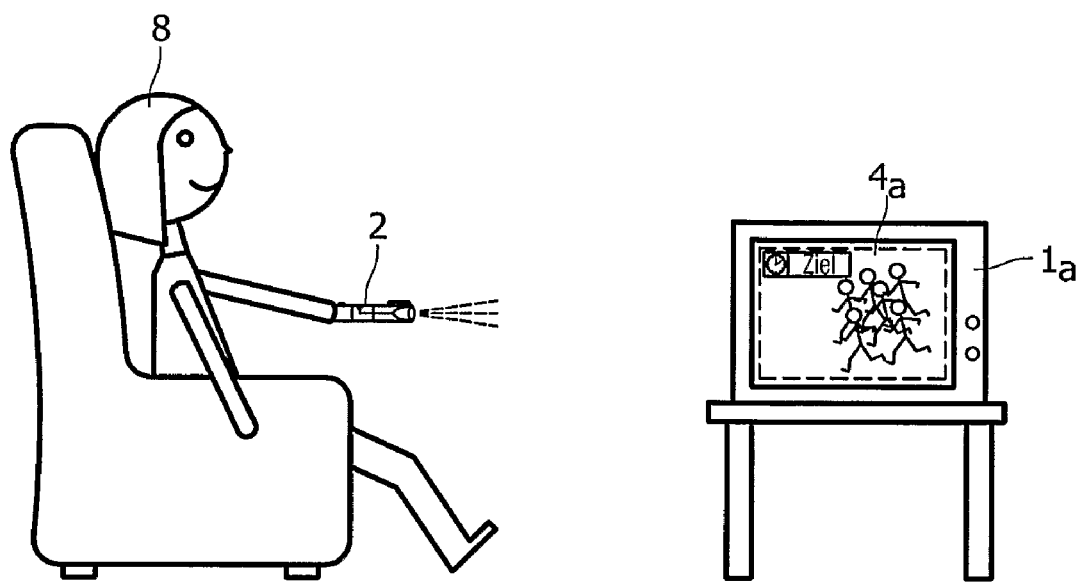
FIG. 1 is a schematic diagram showing a user with a pointing device and a device to be controlled.

FIG. 1 shows a user 8 aiming a pointing device 2 at a device $1_a$ to be controlled, in this case a television $1_a$. In this embodiment, the visual presentation $4_a$ of the user options is dynamically displayed on the television screen. The pointing device 2 generates images of areas targeted on the visual presentation 4. The television 1 contains a control unit which receives the images transmitted from the pointing device 2.

Figure 2:
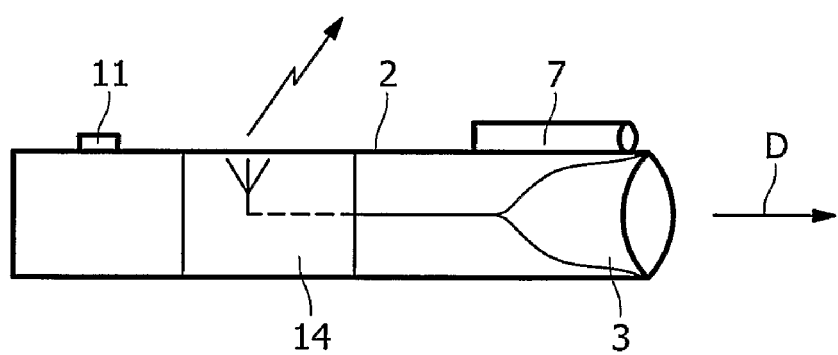
FIG. 2 is a schematic diagram of a pointing device in accordance with an embodiment of the present invention.

FIG. 2 shows a pointing device 2 containing a camera 3, which generates images of the area in front of the pointing device 2 in the direction of pointing D. The pointing device 2 features an elongated form, so that the direction of pointing D lies along the longitudinal axis of the pointing device 2. The camera 3 is positioned towards the front of the pointing device 2 so that images are generated of the area in front of the pointing device 2 at which the user 8 is aiming. The images are transmitted by means of a transmitter 14 enclosed in the housing of the pointing device 2 and are transmitted in a wireless manner, e.g. Bluetooth, or 802.11b standards. A laser light source 7, mounted on the pointing device 2, emits a beam of laser light L parallel to the longitudinal axis of the pointing device 2 in the direction of pointing D. In this embodiment, the pointing device 2 features a button 11. The button 11 can be pressed by the user, for example to confirm that he has made a selection and to transmit the image of the target area. Alternatively, such a button 11 might additionally be used to activate or deactivate displaying of the visual presentation, so that the user interface options are only displayed when actually required by the user. Alternatively, the function of the button 11 might be to activate or deactivate the light source 7 mounted on the pointing device, or to activate or deactivate the pointing device 2 itself. Equally, the pointing device might be activated by means of a motion sensor incorporated in the pointing device 2, so that the visual presentation is automatically displayed when the user takes hold of the pointing device 2. The pointing device 2 draws its power from one or more batteries, not shown in the figure. Depending on the consumption of the pointing device, it may be necessary to provide a cradle into which the pointing device 2 can be placed when not in use, to recharge the batteries.

Figure 3:
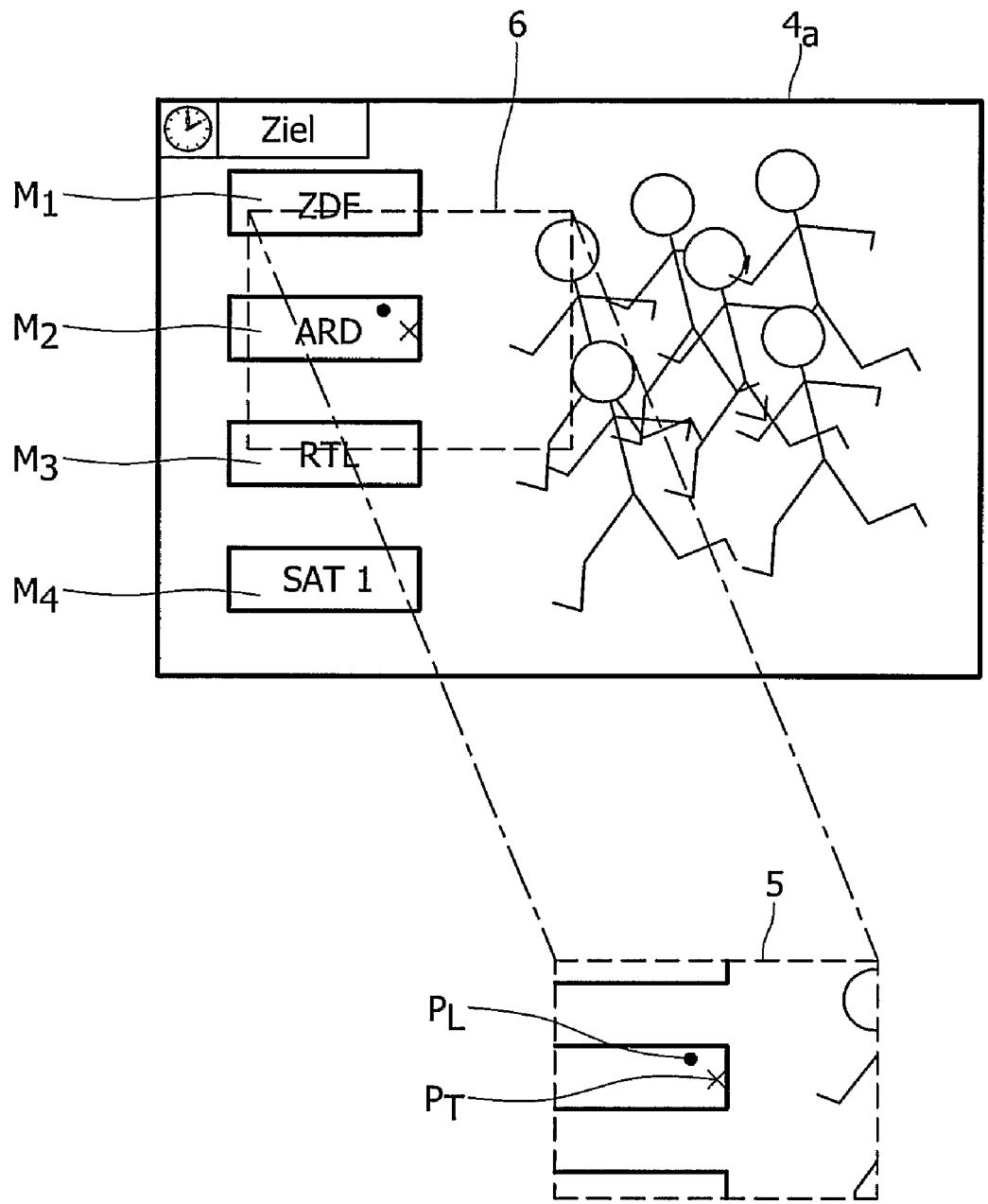
FIG. 3 is a schematic diagram of a visual presentation of a device to be controlled and an associated target area image.

FIG. 3 shows a visual presentation $4_a$—as displayed on a television screen or projected onto an appropriate backdrop—of a number of user options for a device to be controlled. A pointing device, not shown in the figure, is being aimed at a target area 6 of the visual presentation $4_a$. With the aid of a laser point $P_L$ generated by a laser light source on the pointing device, the user can select one of the menu options ($M_1$, $M_2$, $M_3$, $M_4$) shown in the visual presentation $4_a$. A camera in the pointing device generates an image 5 of the target area 6 centred around an image centre point $P_T$. The laser point $P_L$ also appears in the target area image 5. The laser point $P_L$ may be a distance removed from the image centre point $P_T$, or might coincide with the image centre point $P_T$.

Figure 4:
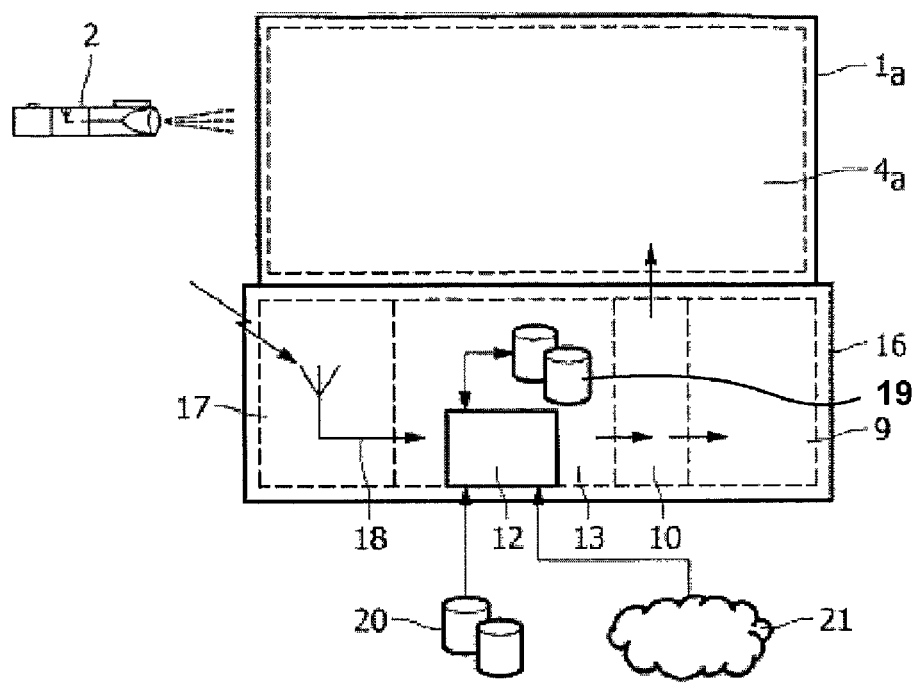
FIG. 4 is a schematic diagram of a device to be controlled comprising a control unit and a pointing device in accordance with an embodiment of the present invention.

FIG. 4 shows a consumer electronics device 1 incorporating a display, for example a television screen, and a control unit 16. The control unit 16 comprises a receiver 17 which is capable of receiving target area images 5 of a visual presentation $4_a$, shown in this case on a screen of the device 1, transmitted from a pointing device 2 aimed at the visual presentation $4_a$. The target area image data 18 is passed to an image interpreter 13. An accessing unit 12 can access pre-defined templates, for example from an internal memory 19, an external memory 20, or the internet 21. Ideally the accessing unit 12 has a number of interfaces allowing access to external data 20, for example the user might provide pre-defined templates stored on a memory medium 20 such as floppy disk, CD or DVD. The templates may also be configured by the user, for example in a training session for the control unit 16, in which the user specifies the correlation between specific areas on the template with particular functions.

The image interpreter 13 makes use of computer vision algorithms to compare the target area images 18 to the pre-defined templates in order to determine the option selected by the user. Information about the chosen option is forwarded to a dialog controller 10, which acts to instruct the device 1 to carry out the function associated with the option, e.g. to switch to the selected channel, and also instructs a visual presentation controller 9 which, for example, updates the visual presentation $4_a$ to show a different menu level or deactivates the visual presentation $4_a$.

Figure 5:
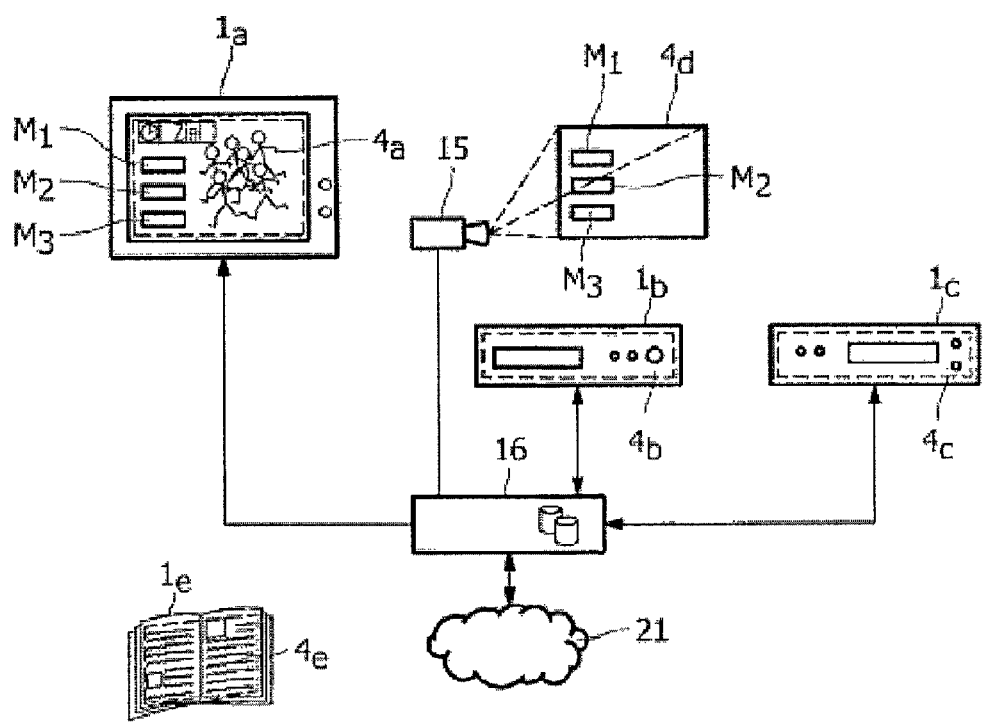
FIG. 5 is a schematic diagram of a control unit and a plurality of devices to be controlled in accordance with an embodiment of the present invention.

FIG. 5 shows a number of consumer electronics devices $1_a$, $1_b$, $1_c$ connected to a control unit 16. The devices $1_a$, $1_b$, $1_c$ feature different means of visually presenting to a user the options they proffer. Device $1_a$, for example a television, displays its user options on its own screen $4_a$ A user can aim a pointing device at the options displayed on the television screen $4_a$, for example to switch channels, change loudspeaker volume, view videotext etc. The fronts of the devices $1_b$ and $1_c$, for example a DVD player or VCR, display the user options for these devices and are used as visual presentations $4_b$ and $4_c$.

Here, the user can aim the pointing device at one of $1_b$ or $1_c$ to, for example, fast-forward the DVD or video cassette contained in the device.

Another visual presentation $4_e$ is shown in the form of a TV program guide $1_e$. The user can aim a pointing device over the pages of the program guide $4_e$ to select a desired program. The control unit 16 then acts accordingly, for example by issuing commands to the television $1_a$ to switch to the appropriate channel if the program is already running. If the program commences at a later point in time, the control unit 16 might display appropriate prompts on the television screen $4_a$, for example, whether the program is to be recorded later by the VCR $1_c$. To ensure compatibility between image interpretation software and TV guide format, the software can be updated on a regular basis or as required by downloading up-to-date versions from the internet 21.

A beamer or projector 15 displays a further visual presentation $4_d$ in the form of an image backdrop, which might be associated with one or more of $1_a$, $1_b$, $1_c$ with $1_e$, or with another device not shown in the figure, onto a wall or other suitable surface. Images of target areas of any of the visual presentations $4_e$ transmitted from a pointing device (not shown in the figure) are received by the control unit 16 and compared to pre-defined templates of the visual presentations $4_a$, $4_b$, $4_c$, $4_d$, $4_e$. The predefined templates can be stored locally in the control unit. For example, predefined templates for devices $1_b$ and $1_c$ can be stored once in the control unit, since the front of such a device remains static. Templates for the visual presentations for a device such as a television $1_a$ might change intermittently, for example it might be possible for a user to program the device to customise the menu-driven operation, so that the menu levels and their corresponding templates might take on a different appearance. The templates for a TV program guide are updated by the control unit with every issue of the program guide. These templates are downloaded from the internet 21 by means of a suitable interface. The control unit 16 determines which of the visual presentations $4_a$, $4_b$, $4_c$, $4_d$, $4_e$ has been targeted, and which option has been selected. The control unit then issues appropriate commands to the devices in order to carry out the requested function.

Figure 6:
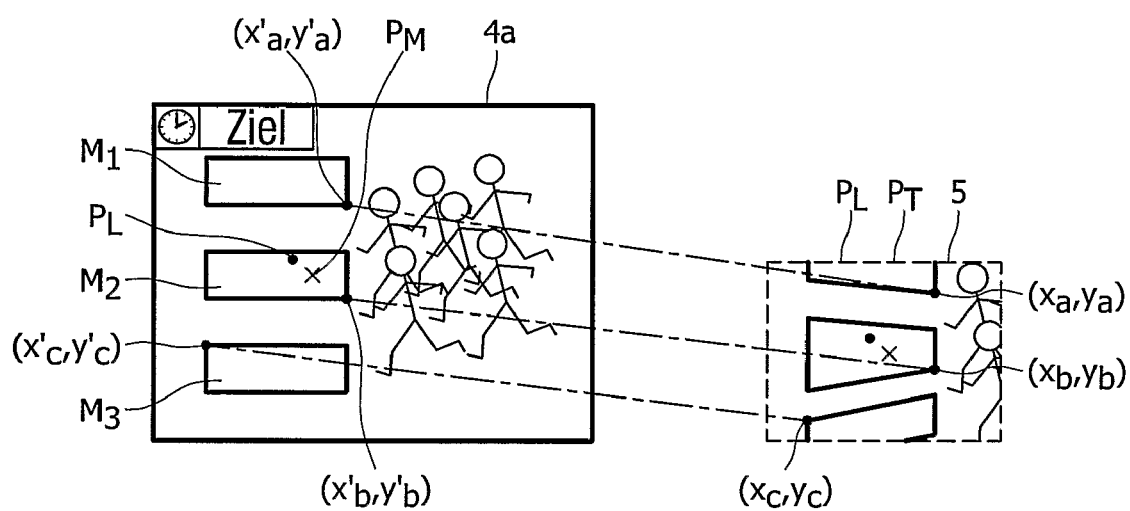
FIG. 6 is a schematic diagram showing a visual presentation and a corresponding target area image in accordance with an embodiment of the present invention.

FIG. 6 shows a schematic representation of a target area image 5 generated by a pointing device 2 and a template for the visual presentation $4_a$. The pointing device is aimed at the visual presentation from a distance and at an oblique angle, so that the scale and perspective of the elements ($M_1$, $M_2$, $M_3$) in the visual presentation $4_a$ appear distorted in the target area image 5. To determine the option selected by the user, in this embodiment the point of intersection $P_T$ of the longitudinal axis of the pointing device 2 with the visual presentation $4_a$ is located. The point in the template corresponding to the point of intersection $P_T$ can then be located to determine the chosen option. To this end, computer vision algorithms using edge- and corner detection methods are applied to locate points in the target area image $[(x_a, y_a), (x_b, y_b), (x_c, y_c)]$ which correspond to points in the template $[(x_a', y_a'), (x_b', y_b'), (x_c', y_c')]$ of the visual presentation $4_a$.

Each point can expressed as a vector e.g. the point $(x_a, y_a)$ can be expressed as $\vec{v}_a$. As a next step, a transformation function $T_\lambda$ is developed to map the target area image to the template:

$$f(\lambda) = \sum_i |T_\lambda(\vec{v}_i) - \vec{v}_i'|^2$$

where the vector $\vec{v}_i$ represents the coordinate pair $(x_i, y_i)$ in the target area image, and the vector $\vec{v}_i'$ represents the corresponding coordinate pair $(x_i', y_i')$ in the template. The parameter set $\lambda$, comprising parameters for rotation and translation of the image yielding the most cost-effective solution to the function, can be applied to determine the position and orientation of the pointing device 2 with respect to the visual presentation $4_a$. The computer vision algorithms make use of the fact that the camera 3 within the pointing device 2 is fixed and "looking" in the direction of the pointing gesture. The next step is to calculate the point of intersection of the longitudinal axis of the pointing device 2 in the direction of pointing D with the plane of the visual presentation $4_a$. This point may be taken to be the centre of the target area image $P_T$, or, if the device has a laser pointer, the laser point $P_L$ can be used instead. Once the coordinates of the point of intersection have been calculated, it is a simple matter to locate this point in the template of the visual presentation $4_a$, thus determining the option which the user has selected.

Although the present invention has been disclosed in the form of preferred embodiments and variations thereon, it will be understood that numerous additional modifications and variations could be made thereto without departing from the scope of the invention. The remote control pointing device can serve as the universal user interface device in the home or for navigation through business presentations. In short, it can be beneficial whenever an intention of a user can be expressed by pointing, which means that it can be used for essentially any kind of user interface. Its small form factor and its convenient and intuitive usage can elevate such a simple pointing device to a powerful universal remote control. Its ability to be used to control a multitude of devices, providing access to content items of the devices, as well as allowing for personalisation of the device's user interface options, make this a powerful tool. As an alternative to the pen shape, the pointing device could for example also be a personal digital assistant (PDA) with a built-in camera, or a mobile phone with a built-in camera. The pointing device might be combined with other traditional remote control features, e.g. with additional buttons for performing dedicated functions such as fast scrolling through a long list of items, or with other input modalities such as voice control for direct access to content items of the device to be controlled.

The usefulness of the pointing device need not be restricted to the control of consumer electronics devices, for example it may equally find application within a medical environment, in a home or office environment, or in industry. For example in a home environment, such a pointing device could be used to control almost any electrical appliance which can be controlled by a control unit, for example washing machine, cooker, heating, light fittings. Such a pointing device could make life considerably easier for users who are handicapped or so restricted in their mobility that they are unable to reach the appliances or to operate them in the usual manner.

For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method for control of a device comprising:
   visually presenting a number of user options for the device to be controlled;
   aiming a pointing device comprising a camera at the visual presentation of the user options to choose a desired option;
   generating an image of a target area aimed at by the pointing device;
   comparing the target area image with a pre-defined template of the visual presentation to determine the chosen option.

2. The method according to claim 1, wherein a source of a concentrated beam of light attached to the pointing device shows the user a light point in the visual presentation at which the pointing device is aimed.

3. The method according to claim 1, wherein the chosen option is determined by locating a point in the template corresponding to a target point in the visual presentation at which the user has aimed the pointing device.

4. The method according to claim 3, wherein the light point is located in the target area image and is taken to be the target point.

5. The method according to claim 3, wherein a fixed point in the target area image is taken to be the target point.

6. The method according to claim 1, wherein a desired option is selected by the user by aiming the pointing device at the desired option in the visual presentation and pressing a button on the pointing device.

7. The method according to claim 1, wherein the desired option is selected by the user by moving the pointing device over the visual presentation in a pre-defined pattern.

8. The method according to claim 1, wherein the target point is determined using computer vision algorithms.

9. The method of claim 1, wherein the target point is determined by a method comprising the following steps:
   detecting distinctive points in the target image of the visual presentation;
   determining corresponding points in the template of the visual presentation;
   developing a transformation for mapping the points in the target image to the corresponding points in the template;
   using the transformation to determine the position and aspect of the pointing device relative to the visual presentation;
   locating the intersection point of a certain axis of the pointing device with the visual presentation.

10. The method according to claim 1, wherein the visual presentation of the device options is presented in static form.

11. The method according to claim 1, wherein the visual presentation of the device options is presented dynamically.

12. The method according to claim 1, wherein one or more target area images of user options for a plurality of devices to be controlled are generated and compared to pre-defined templates and, depending on the option chosen, one or more of the plurality of devices are controlled accordingly.

13. A user interface for control of a device, said user interface comprising:
- an accessing unit for accessing pre-defined templates associated with visual presentations of user options for the device to be controlled;
- a pointing device for aiming at a desired option in a visual presentation of the user options, comprising a camera for generating an image of a target area of at least part of the visual presentation;
- an image interpreter for locating the target area or a point of the target area in a pre-defined template in order to determine the chosen option.

14. The user interface according to claim 13, further comprising a transmission interface for transmitting the images to a control unit assigned to a device.

15. The user interface according to claim 13, further comprising a display unit for dynamically displaying a visual presentation of the user options for the device to be controlled.

16. The user interface according to claim 13, further comprising a hardcopy output unit/module for generating a static visual presentation of the user options for the device to be controlled.

17. The user interface according to claim 13, wherein the pointing device includes a camera for generating an image of a target area in the direction in which the pointing device is aimed.

18. The user interface according to claim 17, further comprising a light source for illuminating the target area at which the pointing device is aimed.

19. A control unit comprising a receiver for receiving target area images from a pointing device, an accessing unit for accessing predefined templates associated with visual presentations of user options for a device to be controlled, and an image interpreter for locating the target area or a point of the target area in a pre-defined template in order to determine a chosen option.

* * * * *